(12) United States Patent
Baldini et al.

(10) Patent No.: US 11,953,912 B2
(45) Date of Patent: Apr. 9, 2024

(54) TRAVELING DOWN A PRESCRIBED ARRANGEMENT OF PATHS WITH A MOBILE ROBOT

(71) Applicant: KUKA Deutschland GmbH, Augsburg (DE)

(72) Inventors: Marco Baldini, Augsburg (DE); Alberto Soragna, Brescello (IT); Rainer Keummerle, Munich (DE)

(73) Assignee: KUKA Deutschland GmbH (DE)

( * ) Notice: Subject to any disclaimer, the term of this patent is extended or adjusted under 35 U.S.C. 154(b) by 313 days.

(21) Appl. No.: 17/434,582

(22) PCT Filed: Feb. 27, 2020

(86) PCT No.: PCT/EP2020/055152
§ 371 (c)(1),
(2) Date: Aug. 27, 2021

(87) PCT Pub. No.: WO2020/174049
PCT Pub. Date: Sep. 3, 2020

(65) Prior Publication Data
US 2022/0137637 A1    May 5, 2022

(30) Foreign Application Priority Data
Feb. 28, 2019   (DE) .................. 10 2019 202 702.4

(51) Int. Cl.
*G05D 1/00* (2006.01)
*G01C 21/00* (2006.01)
*G01C 21/34* (2006.01)

(52) U.S. Cl.
CPC ....... *G05D 1/0274* (2013.01); *G01C 21/3446* (2013.01); *G01C 21/3804* (2020.08); *G05D 1/0217* (2013.01)

(58) Field of Classification Search
CPC ............... G05D 1/0274; G05D 1/0217; G01C 21/3446; G01C 21/3804; G01C 21/20
See application file for complete search history.

(56) References Cited

U.S. PATENT DOCUMENTS

2014/0053077 A1* 2/2014 Unnikrishnan ..... G06F 3/04845
715/747
2015/0281910 A1* 10/2015 Choudhury ......... G01C 21/206
455/456.1

(Continued)

FOREIGN PATENT DOCUMENTS

EP       3327697 A1    5/2018
WO    2014198489 A1   12/2014

(Continued)

OTHER PUBLICATIONS

European Patent Office; Search Report in related International Patent Application No. PCT/EP2020/055152 dated Jun. 4, 2020; 4 pages.

(Continued)

*Primary Examiner* — Jess Whittington
*Assistant Examiner* — Brian E Yang
(74) *Attorney, Agent, or Firm* — Dorton & Willis, LLP

(57) ABSTRACT

A method for traveling down a prescribed arrangement of paths which are connected to one another at nodes with a mobile robot. The robot changes from an initial route, which contains all as yet untraveled paths, to a different replacement route including a loop route which retakes at least one path and at least one further path, and a subsequent remaining route which contains all as yet untraveled paths at that time if a value of a quality function for the replacement route is lower than a value of this quality function for the initial route. The quality function is dependent on a first effort, a second effort, and a variable weighting of the first and second values in relation to one another. The variable (Continued)

weighting weights the second effort lower for a first localization uncertainty of the robot.

10 Claims, 2 Drawing Sheets

(56) References Cited

U.S. PATENT DOCUMENTS

| | | |
|---|---|---|
| 2018/0284768 A1 | 10/2018 | Wilkinson et al. |
| 2020/0077860 A1 | 3/2020 | Lamon et al. |
| 2020/0209881 A1* | 7/2020 | Huang ................. G05D 1/0248 |
| 2021/0031891 A1* | 2/2021 | Englot .................... G01S 15/89 |

FOREIGN PATENT DOCUMENTS

| | | |
|---|---|---|
| WO | 20180034820 A1 | 2/2018 |
| WO | 2018095605 A1 | 5/2018 |
| WO | 2019025788 A1 | 2/2019 |

OTHER PUBLICATIONS

German Patent Office; Search Report in related German Patent Application No. 10 2019 202 702.4, dated Feb. 10, 2020; 7 pages.

\* cited by examiner

TRAVELING DOWN A PRESCRIBED ARRANGEMENT OF PATHS WITH A MOBILE ROBOT

CROSS-REFERENCE TO RELATED APPLICATIONS

This application is a national phase application under 35 U.S.C. § 371 of International Patent Application No. PCT/EP2020/055152, filed Feb. 27, 2020 (pending), which claims the benefit of priority to German Patent Application No. DE 10 2019 202 702.4, filed Feb. 28, 2019, the disclosures of which are incorporated by reference herein in their entirety.

TECHNICAL FIELD

The present invention relates to a method for traveling down a prescribed arrangement of paths that are connected to one another at nodes, with a mobile, in particular autonomous, robot, as well as a system and a computer program product for carrying out the method.

BACKGROUND

With simultaneous localization and mapping (SLAM), a mobile robot simultaneously creates a map of its surroundings and determines its pose within this map.

For this purpose, in particular, an arrangement of paths that are connected to one another at nodes can be prescribed for an, in particular, autonomous, mobile robot. The robot can then travel down these paths (autonomously) and carry out a simultaneous localization and map creation. In this way, a priori knowledge about the environment can advantageously be used and the robot's exploration of the environment can be improved.

Thus, autonomous robots and/or a simultaneous localization and map creation represent particularly advantageous applications of the present invention, without this being restricted thereto, but can generally improve the traveling of a prescribed arrangement of paths that are connected at nodes with a mobile robot.

SUMMARY

It is accordingly an object of the present invention to improve the travelling of a prescribed arrangement of paths, which are interconnected at nodes, with a mobile, in particular autonomous, robot.

This object is achieved by a method and a system or computer program product for carrying out a method as described herein.

According to one embodiment of the present invention, a mobile, in one embodiment autonomous, robot changes when traveling down a prescribed arrangement of paths that are connected to one another at nodes, in particular automatically and/or for at least one, in particular at at least one, approached node(s), from an initial route that contains all as yet untraveled paths to a different replacement route if (it is determined that) a value of a quality function for the replacement route is less than a value of this quality function for the initial route.

In one refinement, the robot changes, in particular automatically and/or for at least one, in particular at at least one, approached node(s), from the initial route to that of a plurality of replacement routes for which the value of this quality function is the smallest.

Correspondingly, in one embodiment (for the respective node) the values of the quality function for the (previously planned) initial route and the replacement route(s) are each determined and then the route with the smaller or smallest value of the quality criterion is used as the new (initial) route or its next node(s) are approached with the robot.

In one embodiment, the initial route, the replacement route(s) and/or the destination route(s) each connect the approached node(s) with one or the same prescribed target node.

The replacement route(s) has or have in one embodiment (each) a loop route which is closest in one embodiment, which or on which the robot retakes at least one path after taking this path and at least one further path, and a subsequent remaining route that contains all as yet untraveled paths; in one embodiment, the (respective) replacement route consists of this.

In one embodiment, the quality function depends on a first effort, a second effort and a variable weighting of the first and second values in relation to one another. In one refinement, the quality function can be a weighted sum $C_E = C_1 + K \cdot C_2$ with the quality function $C_E$, the first effort $C_1$, the second effort $C_2$ and a weighting $K$, which is preferably normalized to a range $[0; 1]$, so that in one embodiment the second effort is maximally weighted identically to the first effort and minimally weighted with zero or is hidden.

In one embodiment, the first effort is the smaller of a) a minimum effort for a, in particular the closest, loop route that retakes at least one path after taking this path and at least one further path, and b) a minimum effort for a target route that contains all as yet untraveled paths and no loop route in one embodiment: first effort=minimum (minimum effort for loop route; minimum effort for target route).

In one embodiment, the first effort is therefore the minimum effort for one or the closest loop route, if one or more such is/are available, and otherwise the minimum effort for the target route. In the case (one) of the replacement route(s), the first effort in one embodiment is therefore the effort for its (closest) loop route. For the initial route, the first effort in one embodiment is also the effort for its (closest) loop route, if it has one, and otherwise the minimum effort for the initial route.

In one embodiment, the second effort is a minimum effort for a remaining route that contains all as yet untraveled paths after the loop route (used or relevant for the first effort), thus in one embodiment for the replacement route(s) the minimum effort for their remaining route(s), for the initial route, in one embodiment the effort for the rest of them according to their (closest) loop route, if the initial route has one, and otherwise zero.

In one embodiment, the variable weighting weights the second effort lower for a first localization uncertainty of the robot than for a smaller second localization uncertainty of the robot or is determined accordingly. In one refinement, the variable weighting weights the second effort for a minimal localization uncertainty of the robot to the maximum, in particular equal to the first effort, and/or for a maximum localization uncertainty of the robot to the minimum, in one embodiment with zero. Correspondingly, the weighting in one embodiment depends on the localization uncertainty of the robot, in particular for the node(s) approached or at the node(s) approached, and is thus variable.

This is based on the following ideas in one embodiment:
When traveling down a route, a localization uncertainty of the robot can increase, in particular due to statistical phenomena, sensor inaccuracies or the like.

By traveling down loop routes or retaking at least one path after this path and at least one further path have already been taken at least once, this localization uncertainty can be reduced, as the robot is on the (now) known terrain, or rather can compare the paths traveled several times. In one embodiment, the trivial case of immediately successive retaking a path in opposite directions is disregarded, since this only slightly improves the localization uncertainty.

In one embodiment, the (current) localization uncertainty of the robot is determined, in particular for the node or at the node being approached. In one embodiment then, in one refinement only when a localization uncertainty threshold value is exceeded, one or more replacement routes are planned which each have (at least) one such loop route and thus reduce the localization uncertainty.

The quality criterion compares the effort for this replacement route(s) with the effort for the (previously planned) initial route, taking into account the (determined) localization uncertainty of the robot: if the robot has a low(er) localization uncertainty or the initial route contains an (obvious) loop route anyway, the replacement route is not worthwhile, so to speak, and the robot does not change.

If, on the other hand, the robot has a greater or great localization uncertainty and the initial route does not contain a (sufficiently obvious) loop route, the value of the quality function of the replacement route is reduced due to the low (lower) weighting of its second effort for its remaining route, so that the robot switches to the (corresponding) replacement route in a targeted manner.

As a result, the accuracy and velocity can be optimized in one embodiment at the same time.

In one embodiment, one or more poses of the robot in its environment are determined, in particular at the node(s) approached and/or when travelling down the path to this node, in one embodiment with the aid of one or more robot-fixed and/or one or more environment-fixed sensors.

In one embodiment, a pose comprises a one-, two- or three-dimensional position and/or a one-, two- or three-dimensional orientation of the robot, in one preferred embodiment a two-dimensional position of the robot in a plane and a one-dimensional orientation about a normal to this plane.

In one refinement, a map of the surroundings is created on the basis of these pose(s), with creation in one embodiment comprising, in particular, updating of an existing map.

As already explained, the present invention can be used with particular advantage in SLAM, in particular in order to use a priori knowledge of the environment and at the same time optimize accuracy and velocity.

In one embodiment, the complexity of a route depends on its length and/or the time and/or energy (predicted to be) required to travel with the robot (as). In one refinement, the effort of a route is determined on the basis of its length and/or the time and/or energy (predicted to be) required to travel with the robot.

As a result, in one embodiment, the shortest, fastest, or energy-optimal routes can advantageously be travelled or these criteria can also be taken into account or optimized with one another and/or with other criteria.

In one embodiment, the localization uncertainty of the robot (for one node(s) or at one of the node(s)) depends on the length of a route traveled down up to now (or up to this node), a number of loop routes (already) taken and/or a determination of one or more poses of the robot in its environment. In one refinement, the localization uncertainty is determined on the basis of a length of a previously traveled route (or up to the approached node), a number of loop routes taken and/or a determination of one or more poses of the robot in its environment.

In one embodiment, the localization uncertainty increases with the length of the route traveled down up to now (or up to the node) and/or decreases with an increasing number of loop routes taken or is determined in this way. In one embodiment, this is based on the idea that statistical effects accumulate with increasing route length, and on the other hand, as explained above, their influence can be reduced by loop routes.

In one embodiment, the localization uncertainty of the robot depends on a covariance matrix of its pose, in particular its (main) diagonal amount or sum, in one embodiment proportional or linear.

As a result, the localization uncertainty of the robot can advantageously be quantified or estimated in one embodiment.

In one embodiment, the initial route and/or the replacement route(s) are each determined with a solution method for the so-called "Chinese Postman Problem," CPP, in particular with a solution method for the open and/or selective mailman problem" ("Open/Rural Chinese Postman Problem"). In particular, a remainder of an, in particular previously, determined or initially prescribed initial route from the approached node(s) can be used as the initial route and determined in this way within the meaning of the present invention.

According to one embodiment of the present invention, a system, in particular in terms of hardware and/or software, in particular in terms of programming, is configured to carry out a method described herein and/or comprises:

Means for commanding a change of the robot from an initial route, which contains all as yet untraveled paths, to a different replacement route, which is a loop route which retakes at least one path after taking this path and at least one further path, and has a subsequent remaining route that contains all as yet untraveled paths if a value of a quality function for the replacement route is less than a value of this quality function for the initial route, wherein the quality function depends on a first effort, a second effort and a variable weighting of the first and second values in relation to one another;

wherein the first effort is the smaller of a minimum effort for a loop route, which retakes at least one path after taking this path and at least one further path, and a minimum effort for a target route that contains all as yet untraveled paths;

the second effort is a minimum effort for a remaining route that contains all as yet untraveled paths after this loop route; and the variable weighting weights the second effort for a first localization uncertainty of the robot lower than for a smaller second localization uncertainty of the robot, in particular at a maximum for a minimum localization uncertainty of the robot, in particular identically to the first effort, and/or weighted at a minimum for a maximum localization uncertainty of the robot, in particular hides it.

In one embodiment, the method or system or its means comprises:

(means for) determining the initial route and/or replacement route(s), in particular their loop and/or remaining route(s);

(means for) determining the quality function, in particular the first effort, the second effort and/or the variable weighting, in particular the localization uncertainty of the robot;

means for commanding a change of the robot from the initial route to that of a plurality of replacement routes for which the value of the quality function is the smallest;

means for determining at least one pose of the robot in its environment; and/or means for creating a map of the surroundings on the basis of this pose.

A means within the meaning of the present invention may be designed in hardware and/or in software, and in particular may comprise a data-connected or signal-connected, in particular, digital, processing unit, in particular microprocessor unit (CPU), graphic card (GPU) having a memory and/or bus system or the like and/or one or multiple programs or program modules. The processing unit may be designed to process commands that are implemented as a program stored in a memory system, to detect input signals from a data bus and/or to output output signals to a data bus. A storage system may comprise one or a plurality of, in particular different, storage media, in particular optical, magnetic, solid-state and/or other non-volatile media. The program may be designed in such a way that it embodies or is capable of carrying out the methods described herein, so that the processing unit is able to carry out the steps of such methods and thus, in particular, is able to travel the prescribed arrangement or control or regulate the robot (in doing this). In one embodiment, a computer program product may comprise, in particular, a non-volatile storage medium for storing a program or comprise a program stored thereon, in particular be this, wherein an execution of this program prompts a system or a controller, in particular a computer, to carry out the method described herein or one or multiple of steps thereof.

In one embodiment, one or multiple, in particular all, steps of the method are carried out completely or partially automatically, in particular by the system or its means.

In one embodiment, the system includes the robot.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
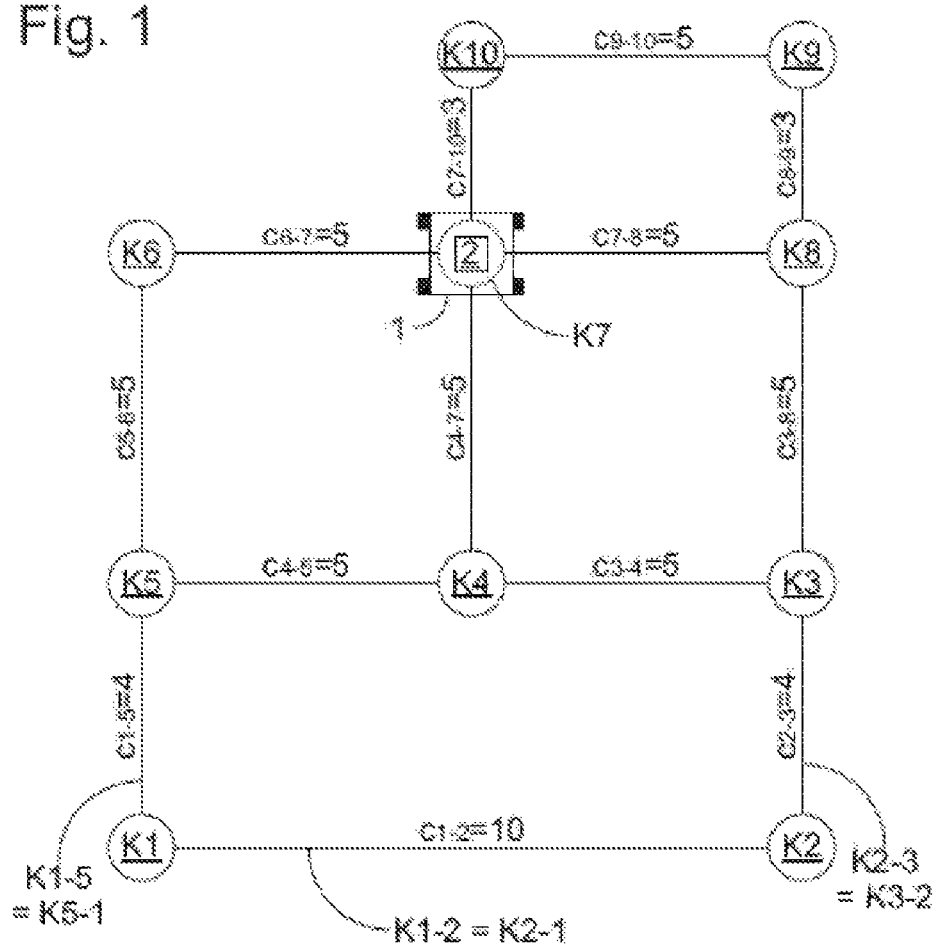
FIG. 1 schematically depicts a mobile robot following a prescribed arrangement of paths according to an embodiment of the present invention.

FIG. 1 shows a prescribed arrangement of paths that are connected to one another in nodes K1-K10, as well as an autonomous mobile robot 1 with a controller 2.

By travelling all paths of the prescribed arrangement, in particular an exploration path for a simultaneous localization and map creation with the robot 1 can be prescribed and a priori environmental information thereby used or taken into account.

Costs c are specified for each of the paths, for which values are given by way of example in FIG. 1, for example costs of 10 units for the path between nodes K1 and K2 ($c_{1-2}=10$). These costs can, for example, depend on the length of the path, the time required to travel down it by the robot 1 or the like, and can in particular indicate or be these.

Figure 2:
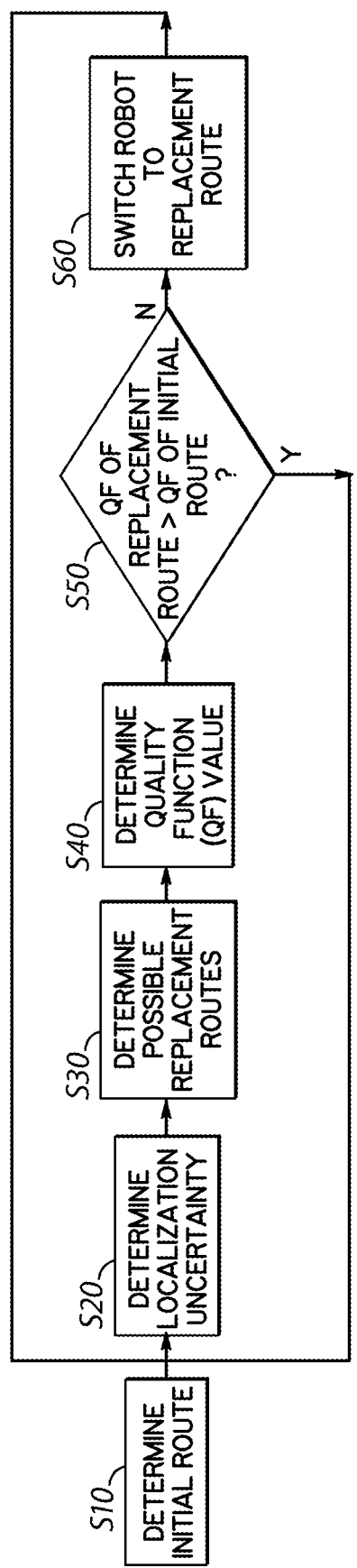
FIG. 2 illustrates a method for traveling the prescribed arrangement of paths with the mobile robot according to an embodiment of the present invention.

In a first step S10 (cf. FIG. 2), a (first) initial route was determined using a CPP solution method which, starting at node K1, contains all paths at least once, and thereby a (total) effort equal to the sum of all costs of all paths traveled is minimized.

In the embodiment, this resulted in the (first) initial route K1→K2→K3→K4→K5→K4→K7→K10→K9→K8→K3→K8→K7→K6→K5→K1.

When following this initial route K1, robot 1 currently approached node K7. For this, the controller 2 determines the current localization uncertainty of the robot in a step S20, for example in the form of quantity normalized to the range [0; 1] or the sum K of the main diagonals of the covariance matrix of the pose of the robot 1 in its environment.

If this value exceeds a specified threshold value (for the first time) for the current node K7, as in the embodiment, since the localization uncertainty has become too great due to the distance to this node without a loop route, for example, the controller 2 determines in a step S30 a (current) initial route, which connects this node with the target node K1 and contains all as yet untraveled paths; in the embodiment, it uses the remainder of the above-mentioned (first) initial; route (K7→K10→K9→K8→K3→K8→K7→K6→K5→K1).

It can be seen that no route is retaken after taking this path and at least one further path, so the current initial route does not have a loop route.

In step S30, the controller 2 additionally determines possible replacement routes which each retake at least one path after taking this path and at least one further path.

To do this, it hides the three most recently traveled paths K3-K4, K4-K5 and K4-K7 and establishes for nodes K3 and K5 that have already been approached that these also then or with hidden paths K3-K4, K4-K5 and K4-K7 can be approached from the current node K7, whereas this is not the case for K4 (in this way, a trivial return K7 K4 is avoided).

For these nodes K3 and K5—with the paths K3-K4, K4-K5 and K4-K7 unhidden—in step S30, by means of an open and/or selective CPP solution method ("Open Rural Chinese Postman Problem"), a loop route is determined, which retakes at least one path after taking this path and at least one further path, and one subsequent remaining path, which route then contains all as yet untraveled paths and leads back to the destination node K1.

The value of a quality function G is determined in a step S40 for the current initial route and replacement routes, each composed of one of the loop routes and the subsequent remaining route.

For this purpose, in step S40, a first effort is determined in each case as the smaller of a minimum effort for of a loop route, which retakes at least one path after taking this path and at least one further path, and a minimal effort for a target route that contains all as yet untraveled paths, as well as a second effort, which is a minimal effort for a remaining route that contains all the paths that have not yet been traveled after this loop route:

current exit route:

$$K7 \to K10 \to K9 \to K8 \to K3 \to K8 \to K7 \to K6 \to K5 \to K1$$

first effort $C_{1,A} =$ $$c_{7-10} + c_{10-9} + c_{9-8} + c_{8-3} + c_{3-8} + c_{8-7} + c_{7-6} + c_{6-5} + c_{5-1}$$

$$(\text{target route}) = 3 + 5 + 3 + 5 + 5 + 5 + 5 + 5 + 4$$
$$= 40$$

second effort $C_{2,A} = 0$

Replacment route with $K5$ or path $4 - 5$:

Loop route: $K7 \to K6 \to K5 \to K4$ first effort $C_{1,E1} = c_{7-6} + c_{6-5} + c_{5-4}$
$$= 5 + 5 + 5$$
$$= 15$$

Remaining route:

$$K4 \to K7 \to K10 \to K9 \to K8 \to K3 \to K8 \to K7 \to K4 \to K5 \to K1$$

second effort $C_{2,E2} = c_{4-7} + c_{7-10} + c_{10-9} + c_{9-8} + +$
$$c_{8-3} + c_{3-8} + c_{8-7} + c_{7-4} + c_{4-5} + c_{5-1}$$
$$= 5 + 3 + 5 + 3 + 5 + 5 + 5 + 5 + 5 + 4$$
$$= 45$$

Replacement route with $K3$ or path $3 - 4$:

Loop route: $K7 \to K8 \to K3 \to K4$ first effort $C_{1,E2} = c_{7-8} + c_{8-3} + c_{3-4}$
$$= 5 + 5 + 5$$
$$= 15$$

Remaining route:

$$K4 \to K7 \to K10 \to K9 \to K8 \to K7 \to K6 \to K5 \to K1$$

second effort $C_{2,E2} = c_{4-7} + c_{7-10} + c_{10-9} + c_{9-8} + +$
$$c_{8-7} + c_{7-6} + c_{6-5} + c_{5-1}$$
$$= 5 + 3 + 5 + 3 + 5 + 5 + 5 + 4$$
$$= 35$$

Then, in step S40, the value of the quality criterion $C_E = C_1 + K \cdot C_2$ for each of the routes is determined:

current initial route: $C_{E,A} = C_{1,A} + K \cdot C_{2,A}$

Replacement route with $K5$ or path 5-4: $C_{E,E1} = C_{1,E1} + K \cdot C_{2,E1}$ Replacement route with $K3$ or path 3-4: $C_{E,E2} = C_{1,E2} + K \cdot C_{2,E2}$ If, for example, the robot 1 is (still or again) perfectly localized at the node 7, its localization uncertainty or the variable weighting of the second effort $C_2$ is equal to 1:

current initial route: $C_{E,A} = 40 + 1.0 = 40$

Replacement route with $K5$ or path $5 - 4$: $C_{E,E1} = 15 + 1.45 = 60$

Replacement route with $K3$ or path $3 - 4$: $C_{E,E2} = 15 + 1.35 = 50$

Since the value of the quality function for the initial route is smaller than the value for the replacement routes (S50: "N"), the robot 1 does not change, but continues along the current initial route.

Conversely, if the robot 1 is localized at node 7 with maximum uncertainty, its localization uncertainty or the variable weighting of the second effort $C_2$ is equal to 0:

current initial route: $C_{E,A} = 40 + 0.0 = 40$

Replacement route with $K5$ or path $5 - 4$: $C_{E,E1} = 15 + 0.45 = 15$

Replacement route with $K3$ or path $3 - 4$: $C_{E,E2} = 15 + 0.35 = 15$

Since the effort for the remaining route is no longer relevant and the value of the quality function for the replacement routes is thereby smaller than the value for the initial route (S50: "Y"), the robot 1 now changes to the (more favorable) replacement route (S60) as desired, wherein in this extreme case with K=0 both substitute routes appear equally good, with little consideration of the remaining route, the replacement route is more favorable with K3 or path 3-4 and is selected.

Although embodiments have been explained in the preceding description, it is noted that a large number of modifications are possible. It is also noted that the embodiments are merely examples that are not intended to restrict the scope of protection, the applications and the structure in any way. Rather, the preceding description provides the person skilled in the art with guidelines for implementing at least one exemplary embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE NUMERALS

1 Mobile robot
2 Controller
K1, . . . , K10 Node
K1-K2,
K2-K3, . . .
K1-K5, Path

What is claimed is:

1. A method for traversing a prescribed arrangement of paths with a mobile robot, wherein the paths are connected to one another at nodes, the method comprising:
   switching the robot from an initial route that contains all remaining untraveled paths of the initial route to a different replacement route and a subsequent remaining route in response to a value of a quality function for the replacement route being less than a value of a quality function for the initial route;
   wherein the replacement route includes a loop route;
   wherein the loop route comprises at least one path that is re-taken after the mobile robot already traversed that path, and at least one further path;
   wherein the subsequent remaining route comprises all remaining untraveled paths of the initial route at the time the mobile robot is switched from the initial route;

wherein the quality function depends on a first effort value, a second effort value, and a variable weighting of the first and second effort values in relation to one another;

wherein the first effort value is the lower of:
   a minimum effort value for a loop route that retakes at least one path after taking that path and at least one further path, and
   a minimum effort value for a target route that contains all remaining untraveled paths of the initial route; and the second effort value is a minimum effort value for a remaining route that contains all remaining untraveled paths of the initial route after the loop route;
and wherein the variable weighting weights the second effort value lower for a first localization uncertainty of the robot than for a smaller second localization uncertainty of the robot.

2. The method of claim 1, wherein at least one of:
the mobile robot is an autonomous robot;
the variable weighting weights the second effort value to a maximum value when the localization uncertainty of the robot is at a minimum;
the variable weighting weights the second effort value to be equal to the first effort value when the localization uncertainty of the robot is at a minimum;
the variable weighting weights the second effort value to a minimum value when the localization uncertainty of the robot is at a maximum; or
the variable weighting weights the second effort value such that it decreases to zero when the localization uncertainty of the robot is at a maximum.

3. The method of claim 1, wherein the robot switches from the initial route to one of a plurality of replacement routes for which the value of the quality function is the smallest.

4. The method of claim 1, further comprising determining at least one pose of the mobile robot in its environment.

5. The method of claim 4, further comprising creating a map of the environment of the mobile robot based on the at least one determined pose.

6. The method of claim 1, wherein an effort value of a route is at least one of:
proportional to a length of the route;
dependent on a time required to travel the route with the robot; or
dependent on an energy expended to travel the route with the robot.

7. The method of claim 1, wherein the localization uncertainty of the mobile robot depends on at least one of:
a length of a previously traveled route;
a number of loop routes traveled by the mobile robot; or
a determination of at least one pose of the mobile robot in its environment.

8. A system for traveling down a predetermined arrangement of paths, which are connected to one another at nodes, with a mobile robot, the system comprising:
means for switching the robot from an initial route that contains all remaining untraveled paths of the initial route to a different replacement route and a subsequent remaining route in response to a value of a quality function for the replacement route being less than a value of a quality function for the initial route;

wherein the replacement route includes a loop route;
wherein the loop route comprises at least one path that is re-taken after the mobile robot already traversed that path, and at least one further path;
wherein the subsequent remaining route comprises all remaining untraveled paths of the initial route at the time the mobile robot is switched from the initial route;
wherein the quality function depends on a first effort value, a second effort value, and a variable weighting of the first and second effort values in relation to one another;
wherein the first effort value is the lower of:
   a minimum effort value for a loop route that retakes at least one path after taking that path and at least one further path, and
   a minimum effort value for a target route that contains all remaining untraveled paths of the initial route; and the second effort value is a minimum effort value for a remaining route that contains all remaining untraveled paths of the initial route after the loop route;
and
wherein the variable weighting weights the second effort value lower for a first localization uncertainty of the robot than for a smaller second localization uncertainty of the robot.

9. The system of claim 8, wherein at least one of:
the mobile robot is an autonomous robot;
the variable weighting weights the second effort value to a maximum value when the localization uncertainty of the robot is at a minimum;
the variable weighting weights the second effort value to be equal to the first effort value when the localization uncertainty of the robot is at a minimum;
the variable weighting weights the second effort value to a minimum value when the localization uncertainty of the robot is at a maximum; or
the variable weighting weights the second effort value such that it decreases to zero when the localization uncertainty of the robot is at a maximum.

10. A computer program product for traversing a prescribed arrangement of paths with a mobile robot, wherein the paths are connected to one another at nodes, the computer program product including a program code stored on a non-transient, computer-readable medium, the program code, when executed by a computer, causing the computer to:
switch the robot from an initial route that contains all remaining untraveled paths to a different replacement route and a subsequent remaining route in response to a value of a quality function for the replacement route being less than a value of a quality function for the initial route;
wherein the replacement route includes a loop route;
wherein the loop route comprises at least one path that is re-taken after the mobile robot already traversed that path, and at least one further path;
wherein the subsequent remaining route comprises all remaining untraveled paths of the initial route at the time the mobile robot is switched from the initial route;
wherein the quality function depends on a first effort value, a second effort value, and a variable weighting of the first and second effort values in relation to one another;
wherein the first effort value is the lower of:
   a minimum effort value for a loop route that retakes at least one path after taking that path and at least one further path, and a minimum effort value for a target route that contains all remaining untraveled paths of the initial route; and the second effort value is a minimum effort value for a remaining route that contains all remaining untraveled paths of the initial route after the loop route;
and
wherein the variable weighting weights the second effort value lower for a first localization uncertainty of the robot than for a smaller second localization uncertainty of the robot.

* * * * *